United States Patent
Breen et al.

(10) Patent No.: US 7,982,430 B2
(45) Date of Patent: Jul. 19, 2011

(54) BATTERY AND SYSTEM POWER SELECTOR INTEGRATION SCHEME

(75) Inventors: John J. Breen, Harker Heights, TX (US); Brent A. McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 11/678,434

(22) Filed: Feb. 23, 2007

(65) Prior Publication Data
US 2007/0132430 A1 Jun. 14, 2007

Related U.S. Application Data

(62) Division of application No. 10/602,582, filed on Jun. 24, 2003, now Pat. No. 7,202,631.

(51) Int. Cl.
*H02J 7/00* (2006.01)
(52) U.S. Cl. .................. 320/128; 320/163; 320/136
(58) Field of Classification Search .............. 320/137, 320/128, 136, 126, 163
See application file for complete search history.

(56) References Cited

U.S. PATENT DOCUMENTS

| | | | |
|---|---|---|---|
| 5,541,489 | A | 7/1996 | Dunstan |
| 5,557,188 | A * | 9/1996 | Piercey .................. 320/134 |
| 5,818,200 | A | 10/1998 | Cummings et al. |
| 5,838,141 | A | 11/1998 | Sengupta et al. |
| 5,847,546 | A | 12/1998 | Sengupta et al. |
| 5,903,764 | A | 5/1999 | Shyr et al. |
| 6,025,698 | A | 2/2000 | Kim et al. |
| 6,150,797 | A | 11/2000 | Mukainakano |
| 6,262,562 | B1 | 7/2001 | Cummings |
| 6,483,204 | B2 | 11/2002 | Hanaki |
| 6,509,717 | B2 | 1/2003 | Lee |
| 6,518,726 | B1 | 2/2003 | Nowlin et al. |
| 6,768,286 | B2 | 7/2004 | Trembley |
| 6,864,666 | B2 | 3/2005 | Breen et al. |
| 6,879,134 | B2 | 4/2005 | Stanesti et al. |
| 6,888,337 | B2 | 5/2005 | Sawyers |
| 6,977,482 | B2 * | 12/2005 | Popescu-Stanesti et al. . 320/116 |
| 7,202,631 | B2 * | 4/2007 | Breen et al. ............... 320/132 |
| 2004/0160213 | A1 | 8/2004 | Stanesti et al. |
| 2004/0263123 | A1 | 12/2004 | Breen et al. |

OTHER PUBLICATIONS

E. Thompson, "Smart Batteries to the Rescue," http://www.mcc-us.com/SBSRescue.pdf, Sep. 1996.
"Embedded Systems", http://www.embedded.com/97/feat9611.htm, Sep. 1996.
"Smart Battery System Specification", http://www.sbs-forum.org/specs/sbse1100.pdf, Revision 1.0, Sep. 5, 1996.
OZ982 SMB Smart Battery Selector, O2Micro, Oct. 1996 @ http://www.o2micro.com/news/pr_961018.html.

* cited by examiner

*Primary Examiner* — Edward Tso
*Assistant Examiner* — Aaron Piggush
(74) *Attorney, Agent, or Firm* — Haynes and Boone, LLP

(57) ABSTRACT

For operating each smart battery included in a smart battery system, the smart battery is initialized prior to the smart battery being electrically coupled to the smart battery system. The smart battery system or an external power source is selected to provide power to an information handling system device. The smart battery includes an electronics device, a charge switch and a discharge switch. The electronics device operates the charge and discharge switches to jointly control an operating condition of the smart battery in response to receiving a control input from a controller of the device. The charge and discharge switches are closed in response to the electronics device and the controller being in agreement to charge the first smart battery. The charge or the discharge switch is opened in response to either the electronics device or the controller directing either of the switches to be opened.

6 Claims, 10 Drawing Sheets

BATTERY AND SYSTEM POWER SELECTOR INTEGRATION SCHEME

CROSS-REFERENCE TO RELATED APPLICATIONS

This application claims priority to and is a divisional of co-owned co-pending U.S. patent application Ser. No. 10/602,582 filed Jun. 24, 2003, incorporated herein by reference in its entirety.

BACKGROUND

The present disclosure relates generally to information handling systems, and more particularly to techniques for integrating selection and operation of power from battery and system power sources commonly used to provide energy to portable information handling system components such as notebook computers, personal digital assistants, cellular phones and gaming consoles.

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by passing an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, because typically, a user of the device powered by the battery had no reliable advance warning that the energy supplied by the rechargeable battery was about to run out.

Today, through the development of "smart" or "intelligent" battery packs, batteries have become a more reliable source of power by providing information to the IHS and eventually to a user as to the state of charge, as well as a wealth of other information. The "smart rechargeable battery", which is well known, is typically equipped with electronic circuitry to monitor and control the operation of the battery. A smart battery system, which typically includes at least one smart battery, is operable to provide power to a portable device.

It is desirable to maximize the amount of time the portable device may be used in a battery-operated mode. Various well-known power management tools and methods of extending the time of use of batteries exist.

In one such method, two or more batteries are included for use in a power supply for supplying energy to the portable device. In such dual battery systems, in order to limit the possibility of an over current condition it is common practice that only one of the batteries may be charged or discharged at any given time. Currently, this is accomplished by including in a dual battery system a "smart selector" component for ensuring that only the battery selected by a Basic Input Output System (BIOS) in accordance with various criteria is connected to be charged or discharged at a given time.

While smart selector circuits serve an important purpose, they suffer certain deficiencies. For example, smart selector circuits typically include several switches each including back-to-back FET's to control which battery is being charged or discharged, making it a fairly expensive circuit to implement.

In alternative power supply systems the smart batteries are mutually detected by cross coupling, i.e., by directly connecting an output of one to an input of another and vice versa. While the mutual detection technique reduces the number of switches, it may not offer sufficient protection in the operation of the internal switch in case of conflicts. For example, the functionality provided by some of the removed components may not be adequately included in the improved design. More specifically, while battery A is being charged, a user may insert a new battery B, which has the internal switch in a closed position. This may result in both batteries being charged simultaneously, possibly causing an over current condition. As another example, while transitioning from charging battery A to battery B or vice versa, the user may disconnect the AC power supply. This may result in an unpredictable state of the internal switch in each battery.

Operating conflicts may arise when the controller wants to charge the battery but the battery is already fully charged or when the controller wants to charge the battery but the battery detects an over current or over temperature condition. A failure to quickly detect the removal of the AC power source may result in a system shutdown if the battery discharge switches remain in an open position. These examples illustrate that operating conflicts typically result in a reduced reliability of the power supply system.

Thus, the presence of smart batteries especially the simultaneous presence of two or more batteries in a portable device imposes certain operating constraints on the AC/smart battery power source selector circuit. Failure to impose the operating constraints may result in generating the operating conflicts, and hence in reduced reliability.

Therefore a need exists to develop techniques for integrating the selection and operation of power from battery and system power sources commonly used to provide energy to portable IHS components. More specifically, a need exists to develop tools and techniques for reducing operating conflicts in a portable device that is less expensive and more reliable than such systems and methods heretofore available. Accordingly, it would be desirable to provide tools and techniques for integrating the selection of battery and system power sources included in an IHS absent the disadvantages found in the prior methods discussed above.

SUMMARY

In one embodiment, for operating each smart battery included in a smart battery system, the smart battery is initialized prior to the smart battery being electrically coupled to the smart battery system. The smart battery system or an external power source is selected to provide power to an information handling system device. The smart battery includes an electronics device, a charge switch and a discharge switch. The electronics device operates the charge and discharge switches to jointly control an operating condition of the smart battery in response to receiving a control input from a controller of the device. The charge and discharge switches are closed in response to the electronics device and the controller being in agreement to charge the first smart battery. The charge or the discharge switch is opened in response to either the electronics device or the controller directing either of the switches to be opened.

Several advantages are achieved by the method and system according to the illustrative embodiments presented herein. The embodiments advantageously provide for a reduced occurrence of operating conflicts and improved reliability while reducing the number of components.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

Each smart battery in a portable device imposes certain operating constraints on the operation and selection of the AC and/or the smart battery system power source, especially when two or more smart batteries are present in the smart battery system. Failure to impose the operating constraints, while attempting to reduce the number of components, may result in generating the operating conflicts. There is a need for integrating the selection and operation of power from battery and system power sources commonly used to provide power to portable devices.

Figure 1:
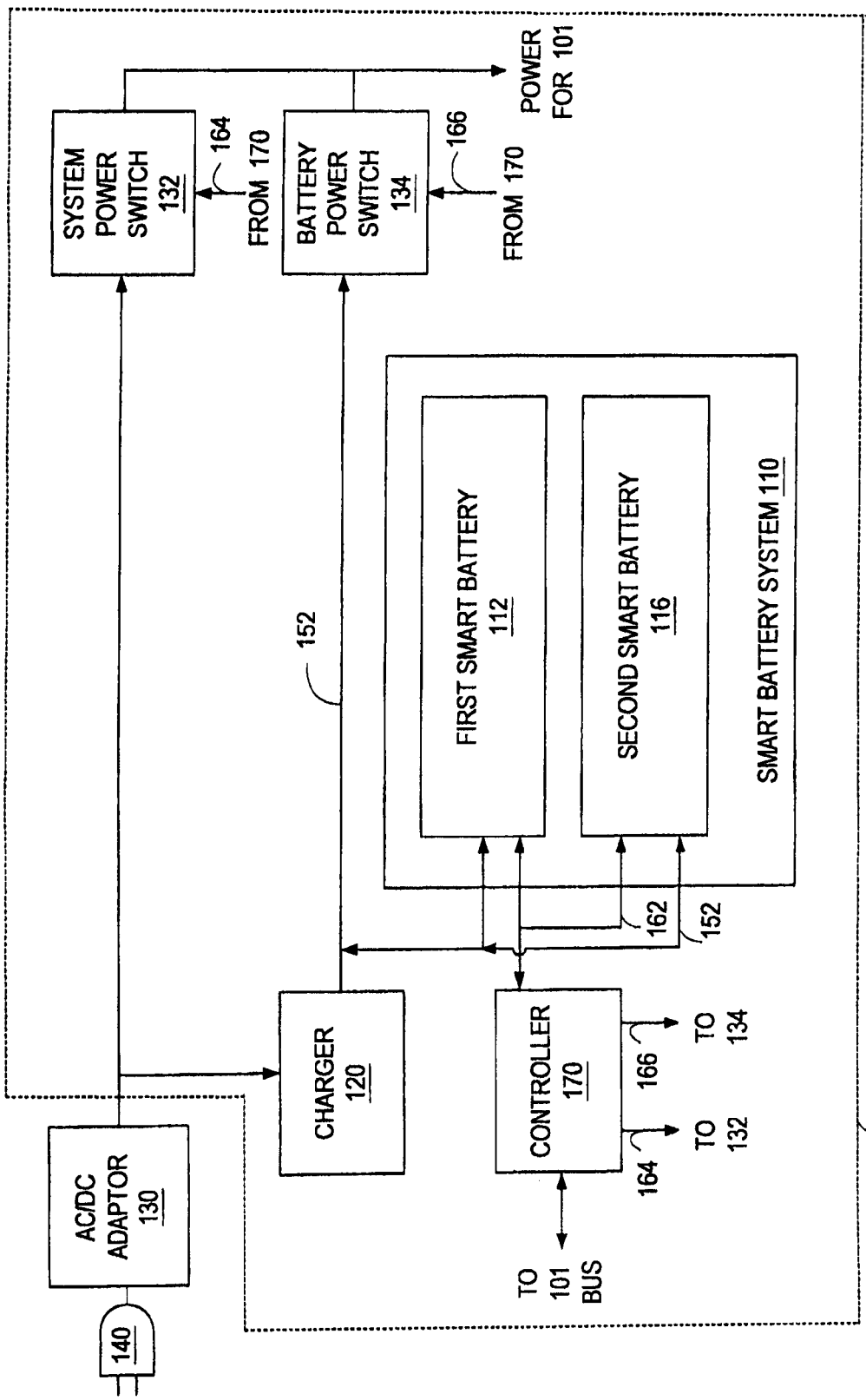
FIG. 1 illustrates a diagrammatic representation of a system for integrating the selection and operation of battery and system power sources used to provide power to portable devices, according to an embodiment.

FIG. 1 illustrates a diagrammatic representation of a system for integrating the selection and operation of battery and system power sources commonly used to provide power to portable IHS devices such as notebook or laptop computers, according to an embodiment. The system for selecting and operating battery and system power sources of the portable device 101 includes: 1) a smart battery system 110, which includes a first smart battery 112 and an optional second smart battery 116, 2) a controller 170 included in the portable device 101 for controlling the selection and operation of the battery and system power sources, 3) an external AC power source 140, 4) an AC/DC adaptor device 130 for converting the AC voltage/power to DC voltage/power, 5) a charger device 120 providing the charge to each of the smart batteries 112 and 116 via a charge line 152, 6) a system power switch 132 for controlling the flow of power from the AC/DC adaptor 130 to the portable device 101 by control line 164, and 7) a battery power switch 134 for controlling the flow of power from the smart battery system 110 to the portable device 101 by control line 166. Additional details of the smart battery system 110 are described in FIG. 2.

The controller 170 included in the portable device 101 is operable to control various inputs and outputs of the device. For example, the controller 170 may be used to control inputs and outputs of a keyboard of the device 101. In this embodiment, the controller 170 is used to receive inputs from various power sources and loads to control the flow of power from various sources of power such as the smart battery system 110 and the AC power source 140 to the various loads of the power such as the portable device 101.

It is well known that smart batteries such as 112 and 116 are operable to control various operating conditions of the battery such as charging, discharging, ready to receive a charge, discharged, and ready to discharge, all of which affect the flow of power. In this embodiment, the intelligence of the controller 170 and the smarts in the batteries 112 and 116 is advantageously combined to reduce the number of components utilized and to reduce occurrences of operating conflicts.

Thus, the controller 170 operating in combination with the smart batteries 112 and 116 controls the flow of power from a source to a load. If AC power source 140 is available then the system power switch 132 is closed and the battery power switch 134 is opened to deliver the power from external source to the portable device 101. While in this operating condition, one of the smart batteries 112 or 116 may receive a charge from the charger 120 when directed jointly by the controller 170 and the corresponding smart battery. If the external AC power source 140 is not available then the system power switch 132 is opened and the battery power switch 134 is closed to deliver the electrical energy stored in the smart battery system 110 to the portable device 101. While in this operating condition, one of the smart batteries 112 or 116 may be selected by the controller 170 and the corresponding smart battery in response to monitoring a charge status of the batteries or in response to other user-defined criteria.

In one embodiment, the battery charge line 152 and the control line 162 may be implemented using a well-known System Management Bus (SMBus) (not shown), which is widely used in the industry. In one embodiment, the battery charge line 152 and the control line 162 may be implemented using dedicated, electrically conducting lines or paths.

Figure 2:
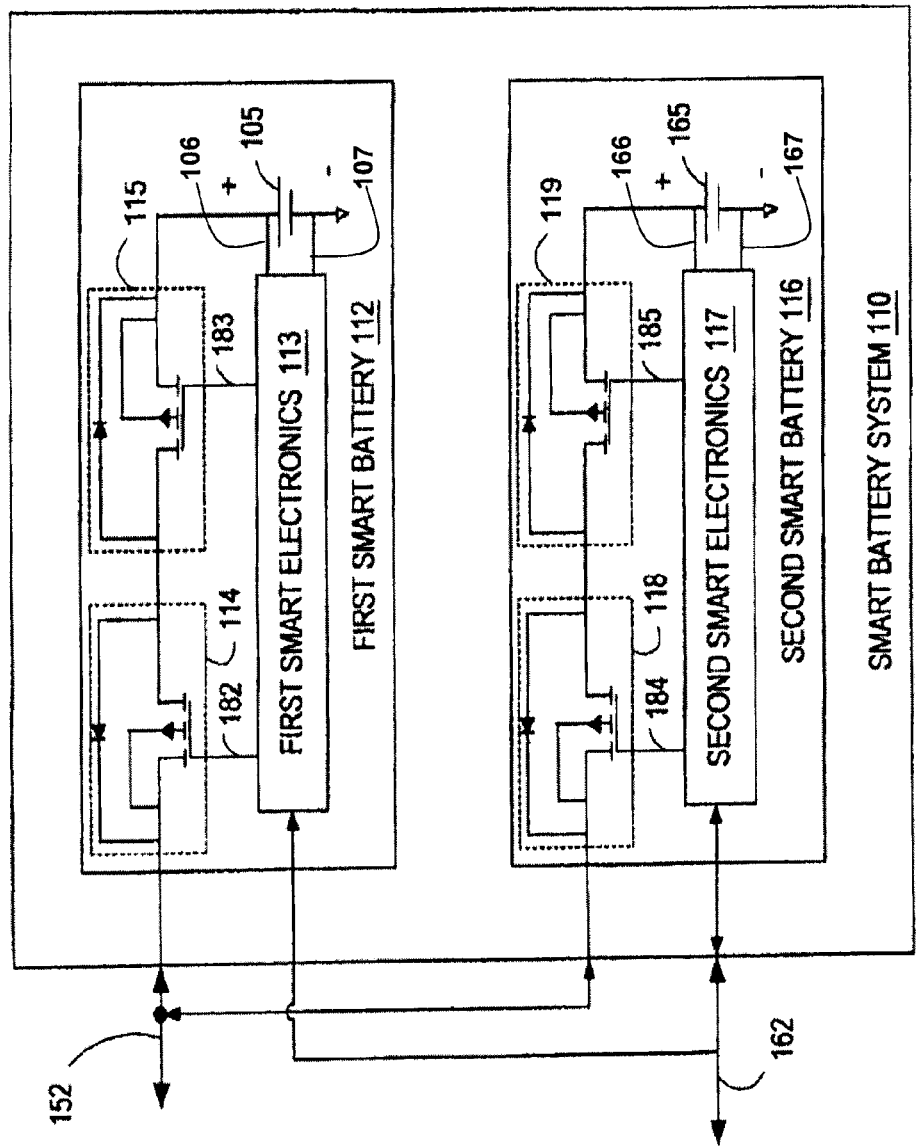
FIG. 2 illustrates a diagrammatic representation of the smart battery system of FIG. 1, according to an embodiment.

FIG. 2 illustrates a diagrammatic representation of the smart battery system 110 including smart batteries 112 and 116, according to an embodiment. The first smart battery 112 includes a first electronics device 113, a first charge switch 114 and a first discharge switch 115. Similarly, the second smart battery 116 includes a second electronics device 117, a second charge switch 118 and a second discharge switch 119. In one embodiment, each of the switches 114, 115, 118 and 119 are implemented using MOSFET body diode devices. The MOSFET body diodes are advantageously used to minimize the impact of an accidental reverse connection of the battery 112 or 116 or other over-current causing conditions. The MOSFET body diodes are also useful to maximize the availability of power to the device 101.

The first smart battery 112 also includes at least one rechargeable cell 105 connected in series with the switches 114 and 115, and having a positive terminal 106 and a negative terminal 107 shown as ground. Other cells may be present but are not shown. The terminals 106 and 107 are coupled to the first electronics device 113 for monitoring purposes. The first electronics device 113 is electrically coupled to the battery charge line 152 and the control line 162 for interfacing with external devices such as the charger device 120 and the controller device 170 respectively.

The first electronics device 113 and the controller 170 jointly control the operating condition such as charging or discharging associated with the first smart battery 112. More specifically, the first electronics device 113 monitors the energy level of the rechargeable cell 105. When requested by the controller 170, the first electronics device 113 is operable to provide energy stored in the rechargeable cell 105 to the portable device 101 during a discharge operating condition. The first electronics device 113 is operable to notify the controller 170 when the energy level of the rechargeable cell 105 falls below a predefined threshold level. During a charge operating condition, the first electronics device 113 is operable to receive a charge from the charger 120 via the charge line 152 and transfer the charge to the rechargeable cell 105 when required.

Similarly, the second smart battery 116 also includes at least one rechargeable cell 165 connected in series with the switches 118 and 119, and having a positive terminal 166 and a negative terminal 167 shown as ground. In one embodiment, the cell 165 may be the same as the cell 105. Other cells may be present but are not shown. The terminals 166 and 167 are coupled to the second electronics device 117 for monitoring purposes. The second electronics device 117 includes the battery charge line 152 and the control line 162 for interfacing with external devices such as the charger 120 and the controller 170 respectively.

Similar to the first electronics device 113, the second electronics device 117 and the controller 170 jointly control the operating condition such as charging or discharging associated with the second smart battery 116. More specifically, the second electronics device 117 monitors the energy level of the rechargeable cell 165. When requested by the controller 170, the second electronics device 117 is operable to provide energy stored in the rechargeable cell 165 to the portable device 101 during a discharge operating condition. The second electronics device 117 is operable to notify the controller 170 when the energy level of the rechargeable cell 165 falls below a predefined threshold level. During a charge operating condition, the second electronics device 117 is operable to receive a charge from the charger 120 via the charge line 152 and transfer the charge to the rechargeable cell 165 when required.

The first charge switch 114 and the first discharge switch 115 are operable to be placed in either an open or closed position in response to receiving outputs generated by the first electronics device 113 and transferred via control lines 182 and 183 respectively. Similarly, the second charge switch 118 and the second discharge switch 119 are operable to be placed in either an open or closed position in response to receiving outputs generated by the second electronics device 117 and transferred via control lines 184 and 185 respectively.

To advantageously reduce occurrences of operating conflicts during a charge operating condition switches 114 and 115 are closed when both, the electronics device 113 and the controller 170, agree that the first smart battery 112 is in the charge operating condition. When both are in agreement the electronics device 113 generates outputs, which result in closing switches 114 and 115, the outputs being transferred via control lines 182 and 183. In case of a disagreement, the logic i.e., the operating condition determined by the electronics device 113 prevails. Operation of switches 118 and 119 is similar. For example, when the controller 170 instructs the first smart battery 112 to charge, but the first smart battery 112 is already fully charged, then the first smart battery 112 is able to override the request from the controller 170 to prevent an overcharge condition. Similarly, if the controller 170 instructs the first smart battery 112 to charge, but the battery 112 detects an over current or over temperature condition then the battery 112 is operable to disconnect itself and terminate the charge request.

Similarly, to advantageously reduce occurrences of operating conflicts during non-charge operating conditions switches 114 and 115 are operable to be opened when either the electronics device 113 or the controller 170 directs the switch 114 or 115 to be opened. The electronics device 113 generates outputs, which result in opening switches 114 or 115, the outputs being transferred via control lines 182 and 183. Operation of switches 118 and 119 is similar.

The smart battery system 110 described above advantageously improves the runtime of the device 101 operating in a battery-powered mode due to reduced losses in the discharge path. The system 110 includes a reduced component count, and hence occupies smaller board space compared to traditional systems thereby resulting in lower costs and higher system reliability. The system 110 having the first and second smart batteries 112 and 116, is operable to efficiently discharge and charge in parallel given appropriate switch controls for each of the switches thereby reducing system power dissipation.

Figure 3A:
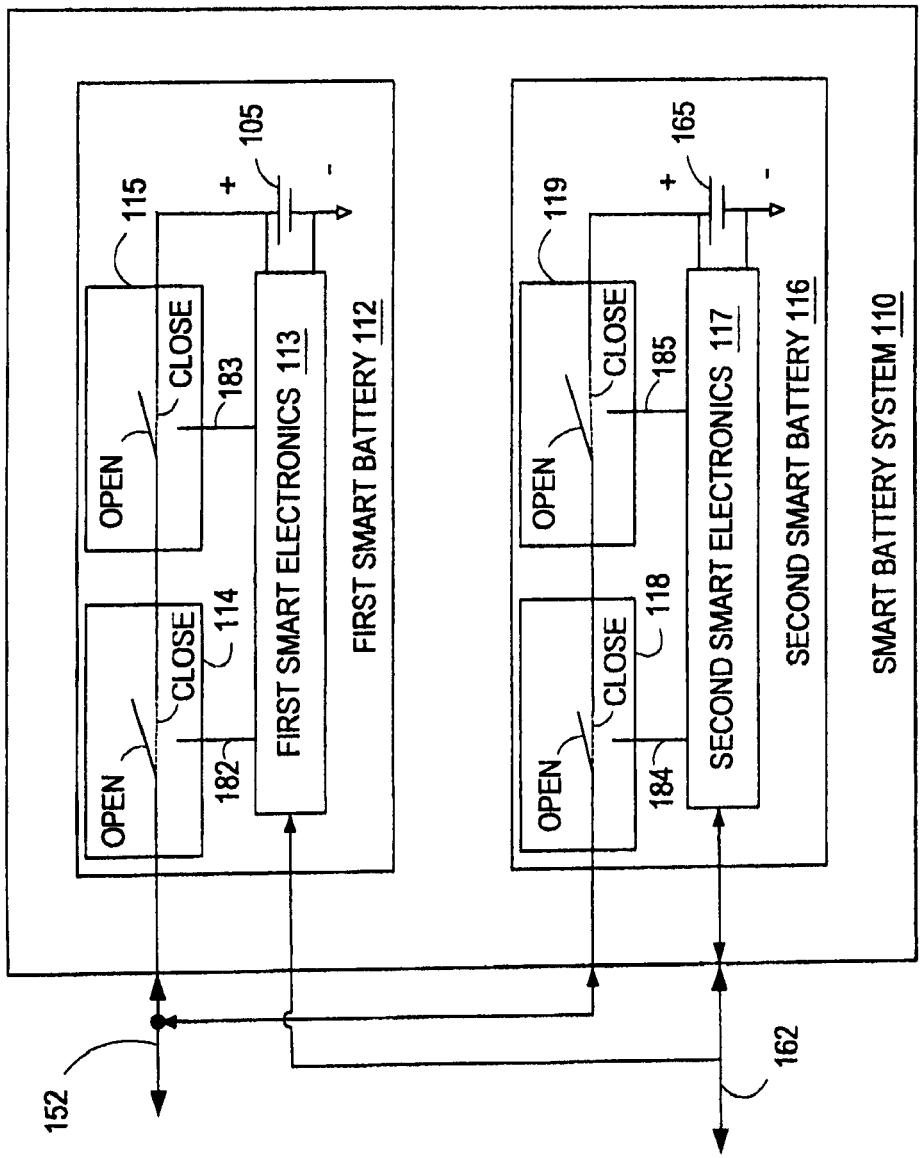
FIGS. 3A, 3B, 3C, 3D, 3E and 3F illustrate various operating states of switches to reduce occurrences of operating conflicts, according to an embodiment.

FIGS. 3A, 3B, 3C, 3D, 3E and 3F illustrate various operating states of switches to reduce occurrences of operating conflicts, according to an embodiment. Referring to FIG. 3A an initialization step is illustrated, according to one embodiment. In this embodiment, in order to advantageously reduce occurrences of an inadvertent charge operating condition upon the introduction of a new smart battery into the smart battery system 110, switches 114 and 115 or switches 118 and 119 are opened during an initialization process for the new battery. The initialization process reduces the occurrence of an inadvertent charge. The initialization process is completed prior to electrically coupling the charge line 152 and the control line 162 to the new battery. That is, the initialization process is completed before the new battery is loaded into the smart battery system 110 and hence electrically coupled to the smart battery system 110. The new battery may include the first and second smart batteries 112 and 116.

Figure 3B:
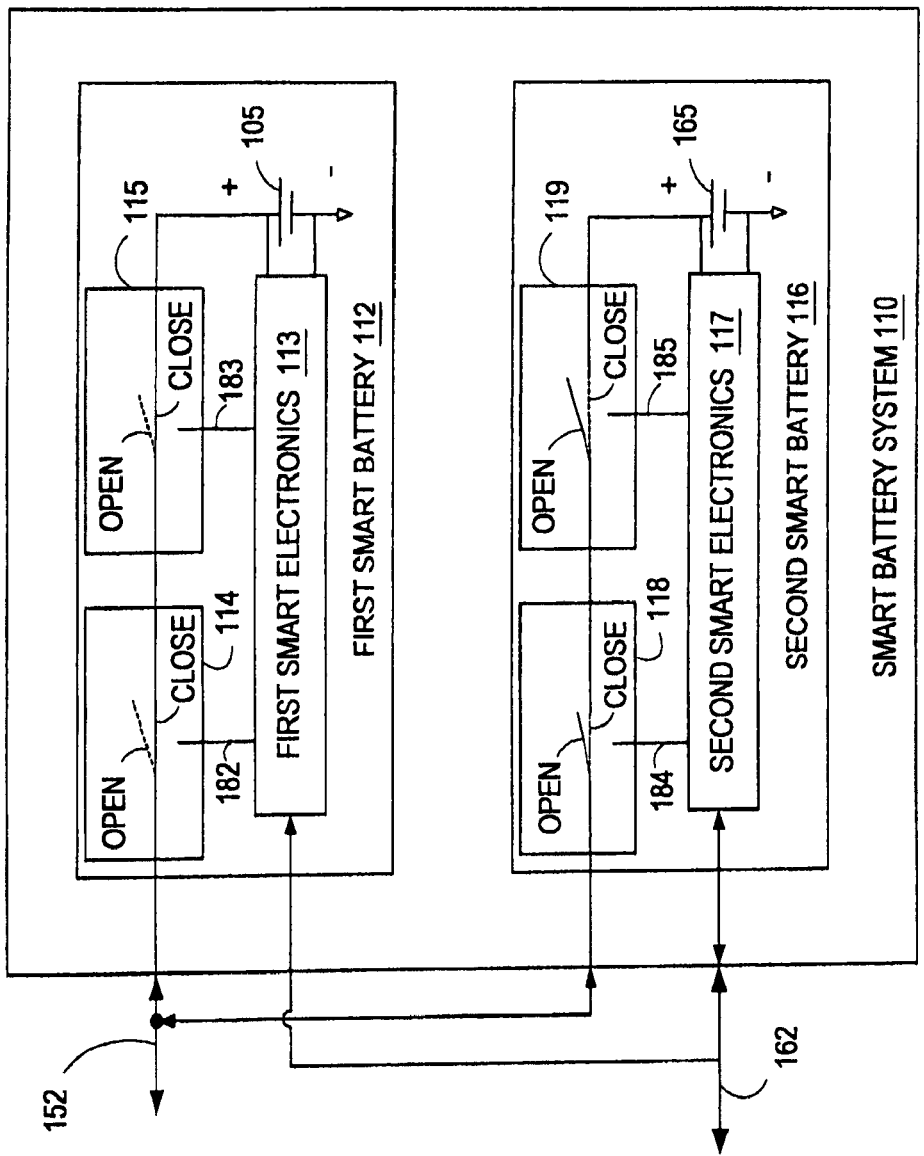

Referring to FIGS. 3B, 3C, 3D, 3E and 3F operating states of switches 114, 115, 118 and 119 while switching from charging of the first smart battery 112 to charging of the second smart battery 116 are illustrated, according to an embodiment. In FIG. 3B, initially the first smart battery 112 is being charged. While switching the charge being provided from the first smart battery 112 to the second smart battery 116, the first charge switch 114 is closed, the first discharge switch 115 is closed, the second charge switch 118 is open, the second discharge switch 119 is open, the system power switch 132 (not shown) is closed and the battery power switch 134 (not shown) is opened.

Figure 3C:
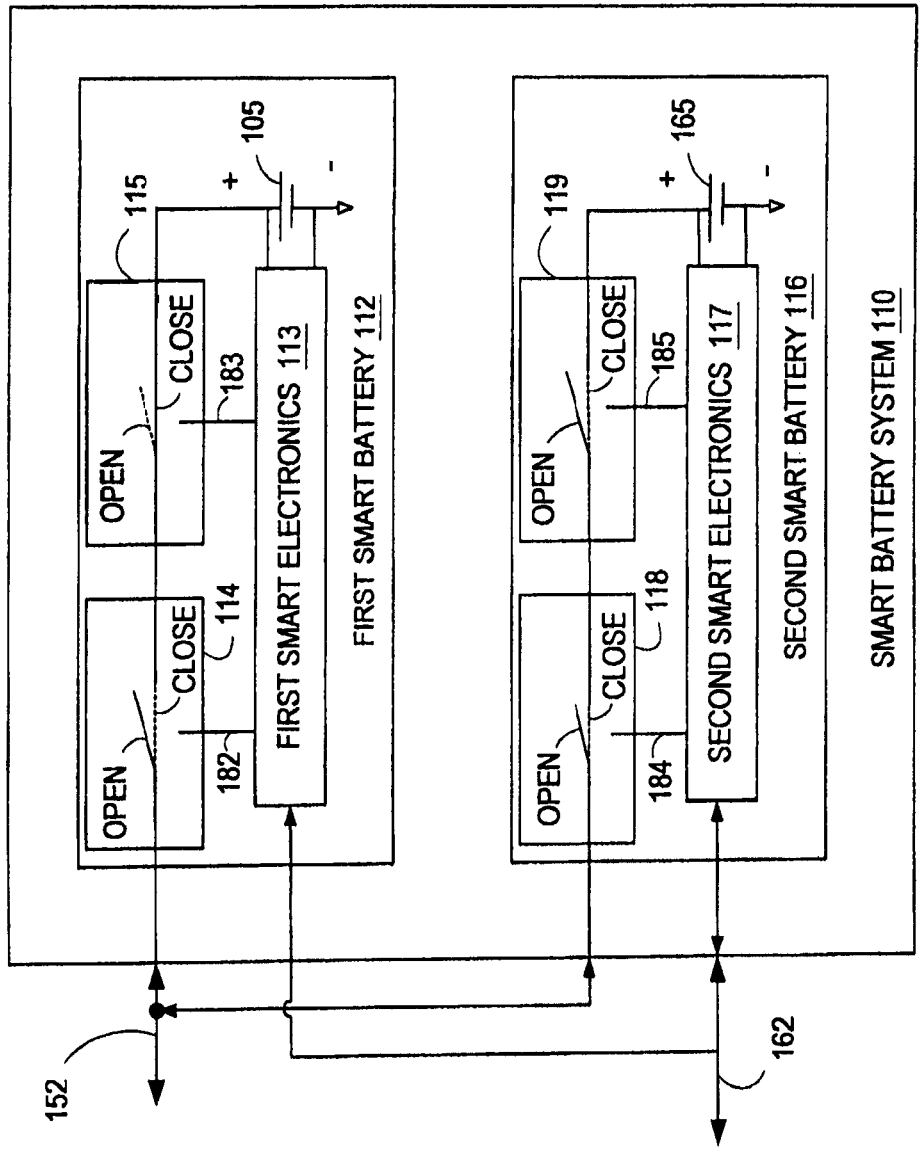
Figure 3D:
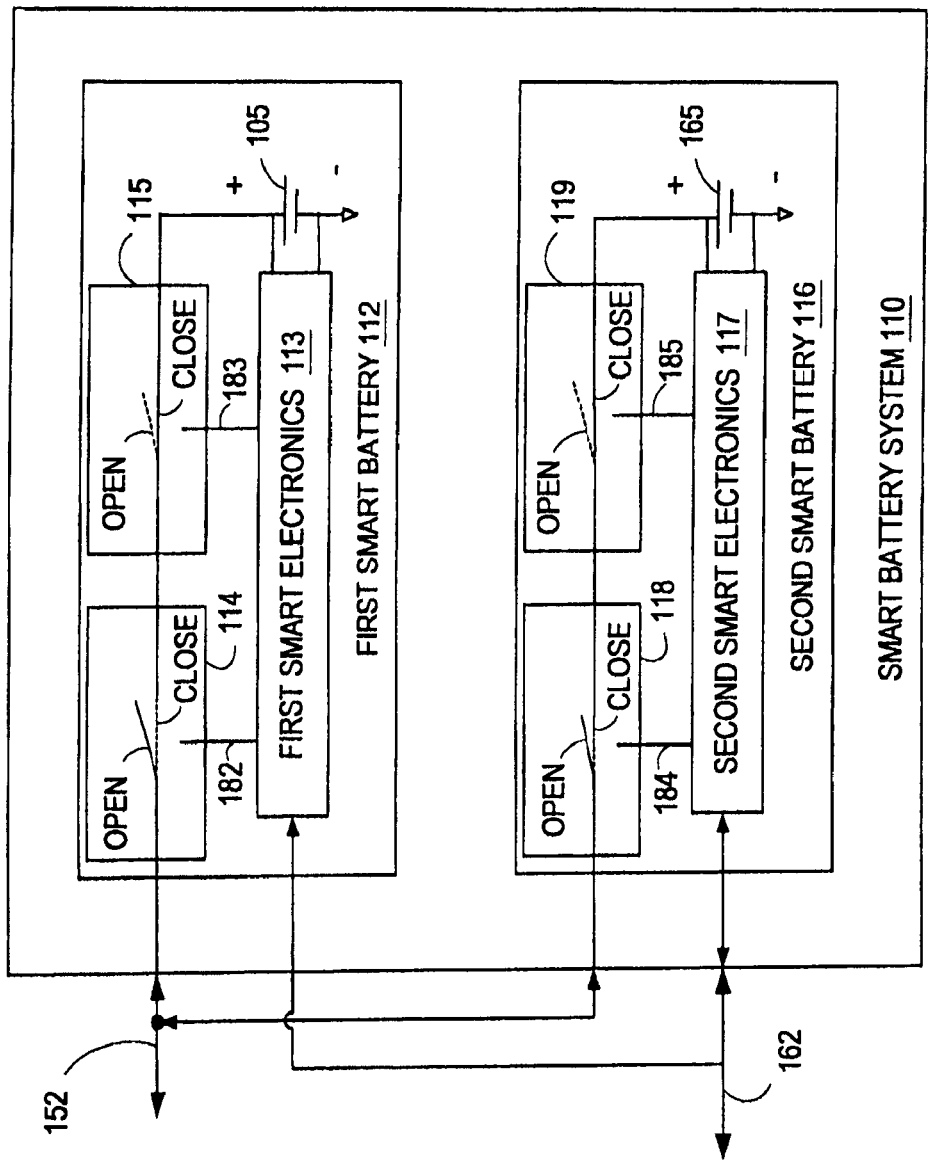
Figure 3E:
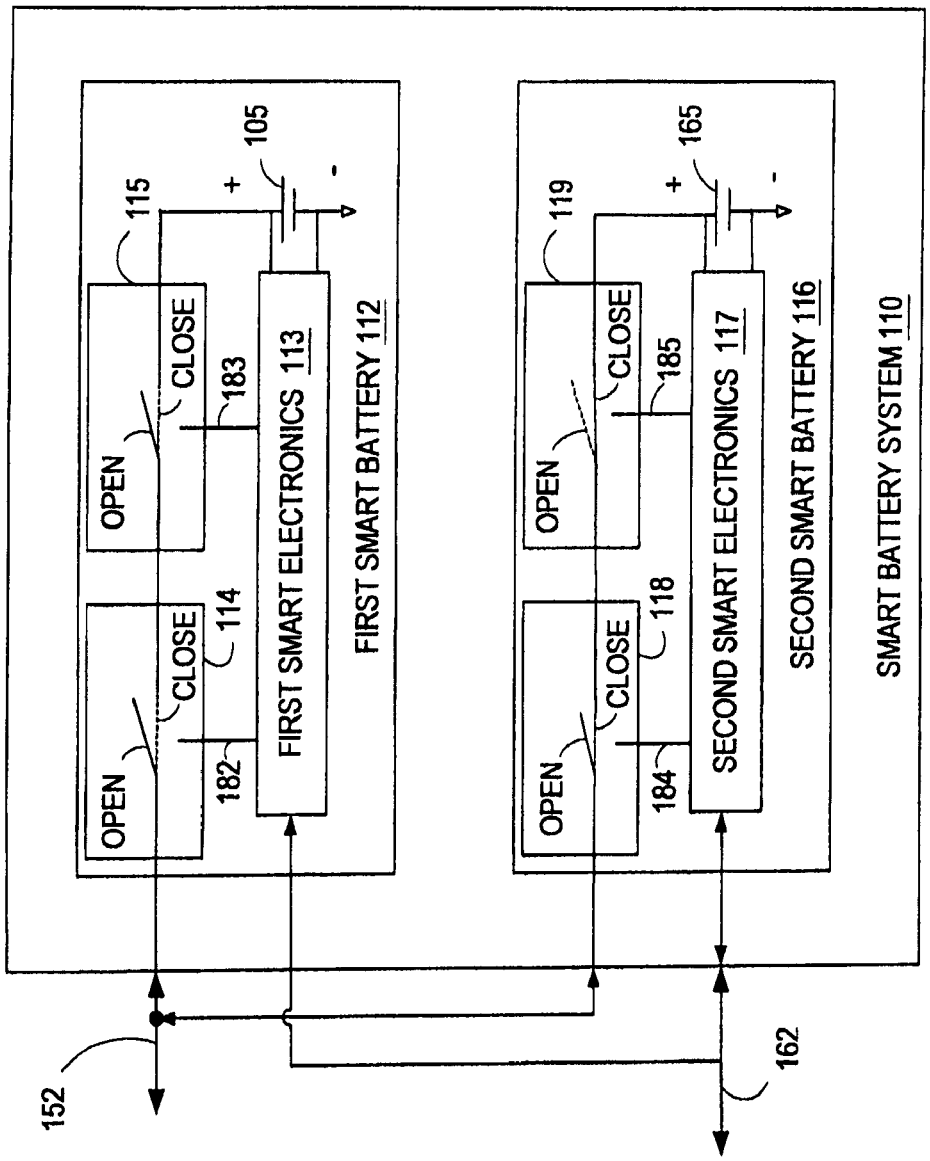
Figure 3F:
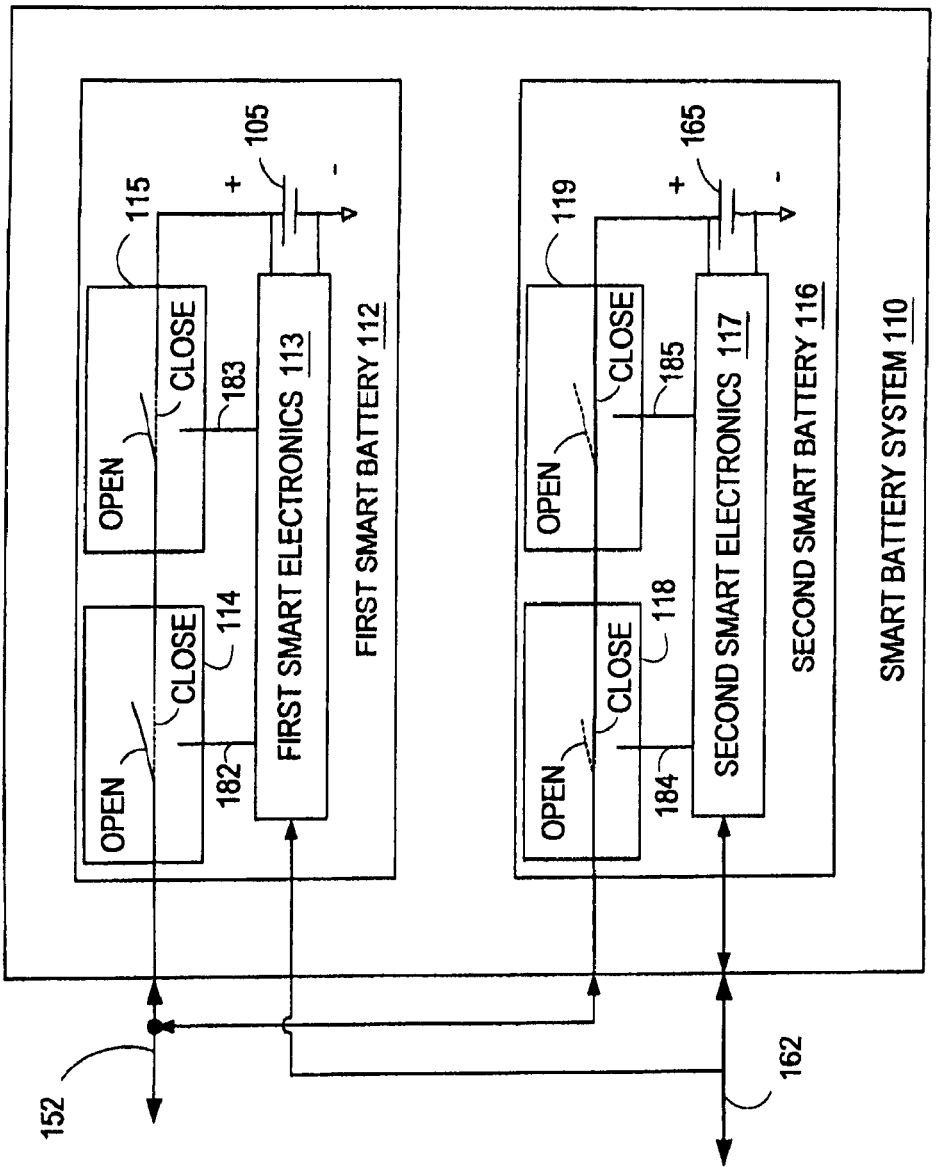

In FIG. 3C, the first charge switch 114 is opened while the first discharge switch 115 remains closed. The second charge switch 118 remains open and the second discharge switch 119 remains open. In FIG. 3D, the second discharge switch 119 is closed and the second charge switch 118 remains open. The first charge switch 114 remains open and the first discharge switch 115 remains closed. In FIG. 3E, the first discharge switch 115 is opened. The first charge switch 114 remains open. The second discharge switch 119 remains closed and the second charge switch 118 remains open. In FIG. 3F, the second charge switch 118 is closed, the second discharge switch 119 remains closed, the first charge switch 114 remains open and the first discharge switch 115 remains open. The switching of charge from the first smart battery 112 to the second smart battery 116 is complete. During the switching sequence, the system power switch 132 remains closed and the battery power switch 134 remains open.

A similar switching sequence may be used to switch a charge from the second smart battery 116 to the first smart battery 112. If the AC power source 140 is removed then the system power switch 132 is opened first followed by closing the battery power switch 134. Similarly, if the AC power source 140 is re-applied then the battery power switch 134 is opened first followed by closing the system power switch 132. The above-described switching sequence advantageously reduces the occurrence of operating conflicts caused due to external events such as removal of AC power source 140 during the transition.

As described earlier, the use of MOSFET body diode devices to implement all switches including 132 and 134 advantageously maximizes power available to the device 101. If AC power source 140 is removed and one of the batteries 112 or 116 has its discharge switch 115 or 119 on then that battery is operable to supply power to the device 101. However, before switch 134 is closed to connect the battery 112 or 116 to the device 101 the logic described above ensures that the switch 132 is open first. This advantageously prevents the user from reapplying AC power 140 before switch 132 is opened. The switching sequences described above control the switches 132, 134, 114 and 115 to advantageously create safe and effective charging conditions, and maximize the availability of power to the device 101. Thus, the above-described switching sequence advantageously reduces the occurrence of operating conflicts caused due to external events such as removal of AC power source 140 during the transition.

Figure 4:
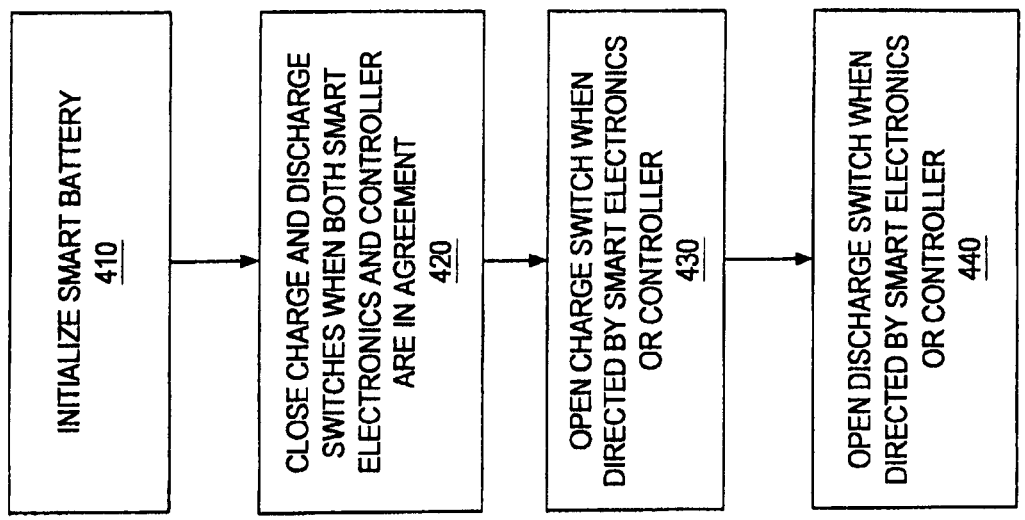
FIG. 4 is a flow chart illustrating a method for operating the first smart battery of the smart battery system, according to an embodiment.

FIG. 4 is a flow chart illustrating a method for operating the first smart battery 112 of the smart battery system 110, according to an embodiment. In step 410, the first smart battery 112 is initialized prior to the first smart battery 112 being electrically coupled to the smart battery system 110. In step 420, the first charge and discharge switches 114 and 115 are closed in response to the first electronics device 113 and the controller 170 being in agreement to charge the first smart battery 112. In step 430, the first charge switch 114 is opened in response to either the first electronics device 113 or the controller 170 directing the first charge switch 114 to be opened. In step 440, the first discharge switch 115 is opened in response to either the first electronics device 113 or the controller 170 directing the first discharge switch to be opened.

Operation of the optional second smart battery 114 of the smart battery system 110 is similar. Various steps described above may be added, omitted, combined, altered, or performed in different orders. For example, steps 430 and 440 may be combined into a single step.

Figure 5:
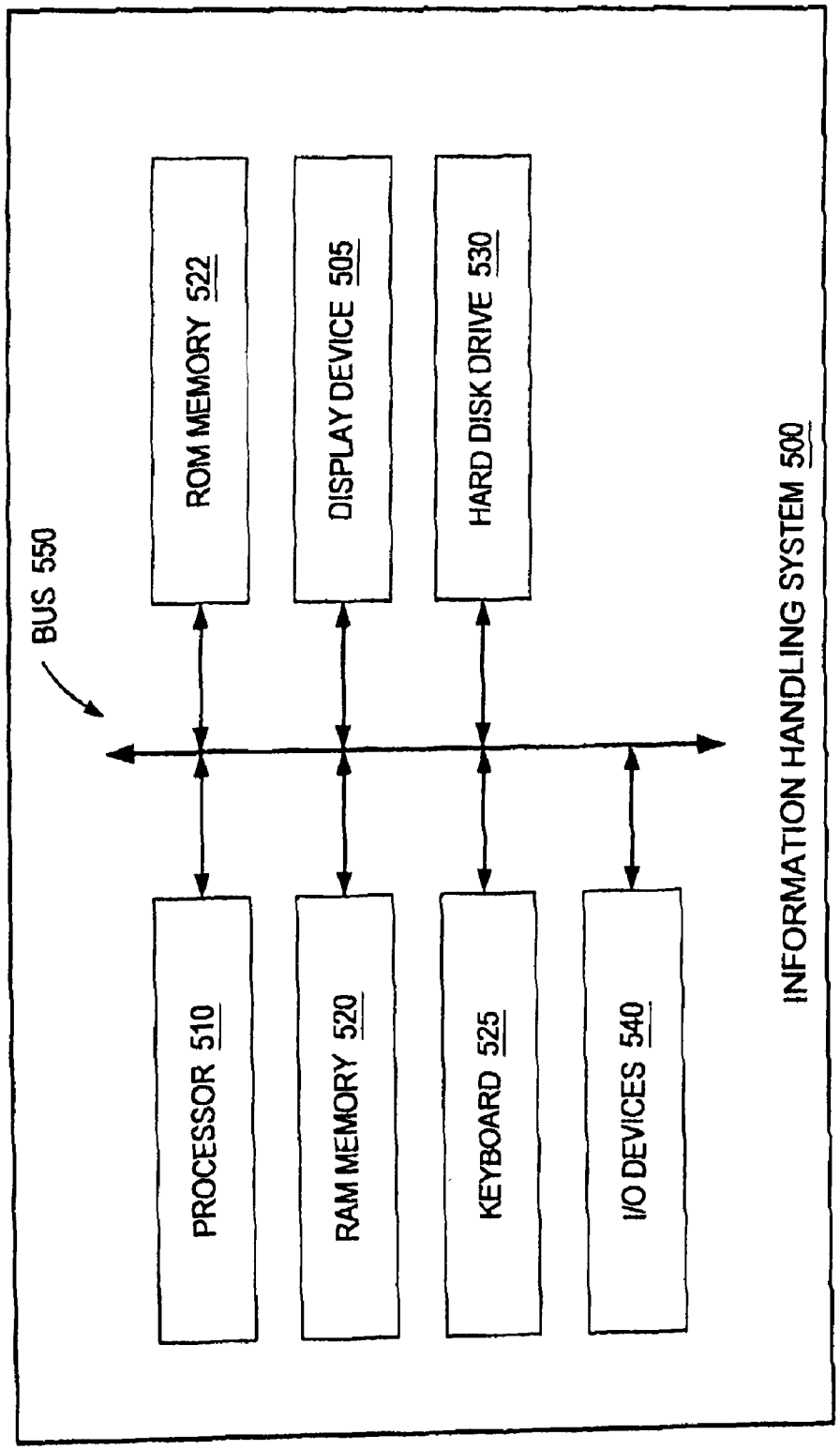
FIG. 5 illustrates a block diagram of an IHS to implement method or apparatus aspects of the present disclosure, according to an embodiment.

FIG. 5 illustrates a block diagram of an IHS to implement method or apparatus aspects of the present disclosure, according to an embodiment. For purposes of this disclosure, an IHS 500 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS 500 may be a personal computer, a network storage device, or any other suitable device and may vary in size, shape, performance, functionality, and price.

The IHS 500 may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring to FIG. 5, the IHS 500 includes a processor 510, a system random access memory (RAM) 520, a system ROM 522, a display device 505, a keyboard 525 and various other input/output devices 540. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. A communications device (not shown) may also be connected to the bus 550 to enable information exchange between the system 500 and other devices.

In one embodiment, the IHS 500 may be used to implement the portable IHS device 101 described in FIG. 1. The smart battery system 110 (not shown) may be configured to provide power to the IHS 500.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising:
providing a portable device including a smart battery system coupled to a system power switch and a battery power switch, wherein the smart battery system includes a first smart battery having a first battery electronics device, a first battery charge switch coupled to the first battery electronics device, a first battery discharge switch coupled to the first battery electronics device, and a first battery rechargeable cell coupled to the first battery electronics device, the first battery charge switch, and the first battery discharge switch, and wherein the smart battery system also includes a second smart battery having a second battery electronics device, a second battery charge switch coupled to the second battery electronics device, a second battery discharge switch coupled to the second battery electronics device, and a second battery rechargeable cell coupled to the second battery electronics device, the second battery charge switch, and the second battery discharge switch;

providing a charge to the first battery rechargeable cell in which the system power switch is closed and the battery power switch is opened, wherein during the charging of the first battery rechargeable cell, the first battery charge switch is closed, the first battery discharge switch is closed, the second battery charge switch is open, and the second battery discharge switch is open;

switching the charge being provided to the first battery rechargeable cell to the second battery rechargeable cell during which the system power switch remains closed and the battery power switch remains opened, wherein the switching comprises:

first, opening the first battery charge switch while leaving the first battery discharge switch closed, the second battery charge switch open, and the second battery discharge switch open;

second, closing the second battery discharge switch while leaving the first battery charge switch open, the first battery discharge switch closed, and the second battery charge switch open;

third, opening the first battery discharge switch while leaving the first battery charge switch open, the second battery charge switch open, and the second battery discharge switch closed; and fourth, closing the second battery charge switch while leaving the first battery charge switch open, the first battery discharge switch open, and the second battery discharge switch closed; and opening the system power switch and closing the battery power switch to provide power from at least one of the first smart battery and the second smart battery.

2. The method of claim 1, wherein the first battery charge switch, the first battery discharge switch, the second battery charge switch, and the second battery discharge switch comprise MOSFET body diode devices.

3. The method of claim 1, wherein the portable device also includes a charger device that is coupled to a power source, the system power switch, and the battery power switch, and that is operable to provide a charge from the power source to the smart battery system.

4. The method of claim 3, wherein during the charging of the first battery rechargeable cell, the system power switch is closed and the battery power switch is open.

5. The method of claim 4, wherein during the switching of the charge being provided to the first battery rechargeable cell to the second battery rechargeable cell, the system power switch remains closed and the battery power switch remains open.

6. The method of claim 1, wherein the system power switch and the battery power switch comprise MOSFET body diode devices.

\* \* \* \* \*